United States Patent
Dunn

(10) Patent No.: US 8,050,160 B2
(45) Date of Patent: Nov. 1, 2011

(54) CHARACTERIZING FREQUENCY RESPONSE OF A MULTIRATE SYSTEM

(75) Inventor: Eric R. Dunn, Cupertino, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 378 days.

(21) Appl. No.: 12/201,915

(22) Filed: Aug. 29, 2008

(65) Prior Publication Data

US 2010/0054098 A1    Mar. 4, 2010

(51) Int. Cl.
*G11B 20/00* (2006.01)
(52) U.S. Cl. ..................................................... 369/53.1
(58) Field of Classification Search ................... None
See application file for complete search history.

(56) References Cited

U.S. PATENT DOCUMENTS

| | | | |
|---|---|---|---|
| 6,204,988 B1 | 3/2001 | Codilian et al. | |
| 6,785,080 B1 * | 8/2004 | Sun et al. | 360/75 |
| 6,996,592 B2 | 2/2006 | Ikai | |
| 7,106,552 B2 * | 9/2006 | Hirano et al. | 360/78.05 |
| 7,116,788 B1 | 10/2006 | Chen et al. | |
| 7,602,572 B2 * | 10/2009 | Abrishamchian et al. | 360/75 |
| 2003/0090275 A1 | 5/2003 | Ioannou | |
| 2006/0109586 A1 * | 5/2006 | White et al. | 360/78.05 |
| 2006/0171062 A1 * | 8/2006 | Hirano et al. | 360/78.05 |
| 2007/0250559 A1 | 10/2007 | Dhaene et al. | |
| 2008/0130162 A1 * | 6/2008 | Yang et al. | 360/77.06 |

* cited by examiner

*Primary Examiner* — Joseph Feild
*Assistant Examiner* — Huy Nguyen
(74) *Attorney, Agent, or Firm* — Patterson & Sheridan, LLP

(57) ABSTRACT

Frequency response is characterized for mechanical components of a multirate system operating in a closed-loop environment. A disturbance is injected at the frequency of interest and at each of the alias frequencies thereof as an input into the multirate system, and a matrix equation composed of resulting measurements of the response of the multirate system is solved to compute the frequency response at the frequency of interest and at each of the alias frequencies. The resulting frequency response can be used to synthesize the transfer function of the entire system, which allows simulation and evaluation of the relative performance of multiple controller designs without the need for further frequency response measurements.

7 Claims, 6 Drawing Sheets

CHARACTERIZING FREQUENCY RESPONSE OF A MULTIRATE SYSTEM

BACKGROUND OF THE INVENTION

1. Field of the Invention

Embodiments of the present invention relate generally to magnetic disk drives and, more particularly, to characterizing the frequency response of multirate systems, such as magnetic disk drives.

2. Description of the Related Art

In the vernacular of feedback control systems, a conventional hard disk drive (HDD) has a closed-loop servo control system comprising a "plant" with one or more moveable elements, e.g., a spindle motor, magnetic disk, and actuator assembly, and a servo controller for driving the moveable elements. Multirate controllers, which generate two or more corrections for each position measurement, are one type of servo controller commonly used in HDDs. Multirate controllers, also referred to as oversampling controllers, are necessary to position the read/write head of an HDD with respect to the center of a data track contained therein with the precision required by the high linear densities now in use for data storage on modern HDDs.

For the design and/or modeling of such controllers, it is advantageous to characterize the open-loop frequency response of the plant, i.e., the magnitude and phase of the mechanical response of the plant at each frequency of interest. This is because the need to understand the behavior of the system when excited at various frequencies appears in almost every practical control system problem, i.e., the open-loop frequency response is routinely considered in order to predict the system's closed-loop behavior. In the case of an HDD system, where the sampling frequency of the output is fixed by the design of the disk drive, characterizing the higher frequency dynamics and resonant frequencies of the system helps in the design or tuning of the servo controller parameters to improve the performance of the servo controller. Improved servo controller performance allows more precise tracking of the disk drive head with respect to the center of the data tracks, which in turn facilitates disk drives having greater storage capacity.

To characterize the frequency response of an HDD plant, the digitized output of the servo control system is typically used. Due to the nature of digital control systems, however, aliasing of the actual mechanical response of the plant occurs. That is, alias frequency components are generated as a result of digitally sampling a signal, i.e., the plant output, when the signal contains frequency components above the Nyquist frequency of the nominal sampling rate. The alias frequency components are measured as actual mechanical resonances, but in fact are only artifacts of the low sampling rate.

According to Shannon's sampling theorem, aliasing makes it impossible to recover the information lost during digital conversion if the sampling frequency is less than half the maximum frequency present in the signal. Aliasing can be minimized or avoided by increasing the sampling frequency well above the marginal sampling frequency dictated by Shannon's sampling theorem. In HDD systems, however, increasing the sampling frequency is generally impracticable, since the disk rotation speed and number of position data sectors on the disk are fixed. Thus, for signal reconstruction to be possible, the limiting frequency is half the sampling frequency, i.e. the Nyquist frequency, and the dynamics and resonant modes of an HDD system corresponding to frequencies close to and above half of the sampling frequency of the HDD cannot be identified with conventional methods.

The conventional method of quantifying the frequency response of a closed loop system is to excite the system with a sinusoidal sweep, record the sampled output data, and use a fast Fourier transform method to calculate the values of the frequency response at selected frequency points. As described above, this method breaks down at frequencies close to and above half of the sampling frequency due to aliasing. Specifically, alias components are measured along with actual mechanical resonances, both above and below the Nyquist frequency of the system. Because the frequency response measurements of an HDD plant take place in a closed-loop environment, both the mechanical resonances and the alias components are fed back through the closed-loop control system being measured, thereby confounding the alias components with the real mechanical resonances of the system and rendering the resultant characterization of the frequency response of the system inaccurate at best.

In light of the above, there is a need in the art for a method of computing the frequency response of a system beyond the Nyquist frequency of the nominal sample frequency.

SUMMARY OF THE INVENTION

In one or more embodiments of the invention, frequency response is characterized for mechanical components of a multirate system operating in a closed-loop environment. A disturbance is injected at the frequency of interest and at each of the alias frequencies thereof, and a matrix equation composed of the resulting measurements is solved to compute the frequency response at the frequency of interest and at each of the alias frequencies. The resulting frequency response is then used to synthesize the transfer function of the entire system, which allows simulation and evaluation of the relative performance of multiple controller designs without the need for further frequency response measurements.

A method for evaluating performance of a multirate system controller, according to an embodiment of the invention, includes the steps of injecting a first disturbance at multiple frequencies of interest as an input into a multirate system, measuring a response of the multirate system after injecting the first disturbance at each of the frequencies of interest, injecting a second disturbance at an alias frequency of each of the frequencies of interest as an input to a multirate system, measuring a response of the multirate system after injecting the second disturbance, and determining effectiveness of the multirate system controller using the measured responses.

A method for selecting a multirate system controller from multiple candidate controller designs, according to an embodiment of the invention, includes the steps of determining a frequency response of the multirate system, modeling a frequency response of each candidate controller design, determining effectiveness of each candidate controller design using the frequency response of the multirate system and the frequency response of the candidate controller design, and selecting a candidate controller design as the multirate system controller based on the effectiveness of the candidate controller designs.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Embodiments of the invention contemplate a method for quantifying the frequency response of the mechanical components of a multirate system operating in a closed-loop environment. This method allows measurement of the frequency response beyond the Nyquist frequency of the nominal sample frequency. The method includes injecting a disturbance at the frequency of interest and at each of the alias frequencies thereof, and solving a matrix equation composed of the resulting measurements to compute the frequency response at the frequency of interest and at each of the alias frequencies. In one embodiment, the resulting frequency response can be used to synthesize the open loop transfer function of the entire loop, which allows simulation and evaluation of the relative performance of multiple controller designs without the need for further frequency response measurements.

Figure 1:
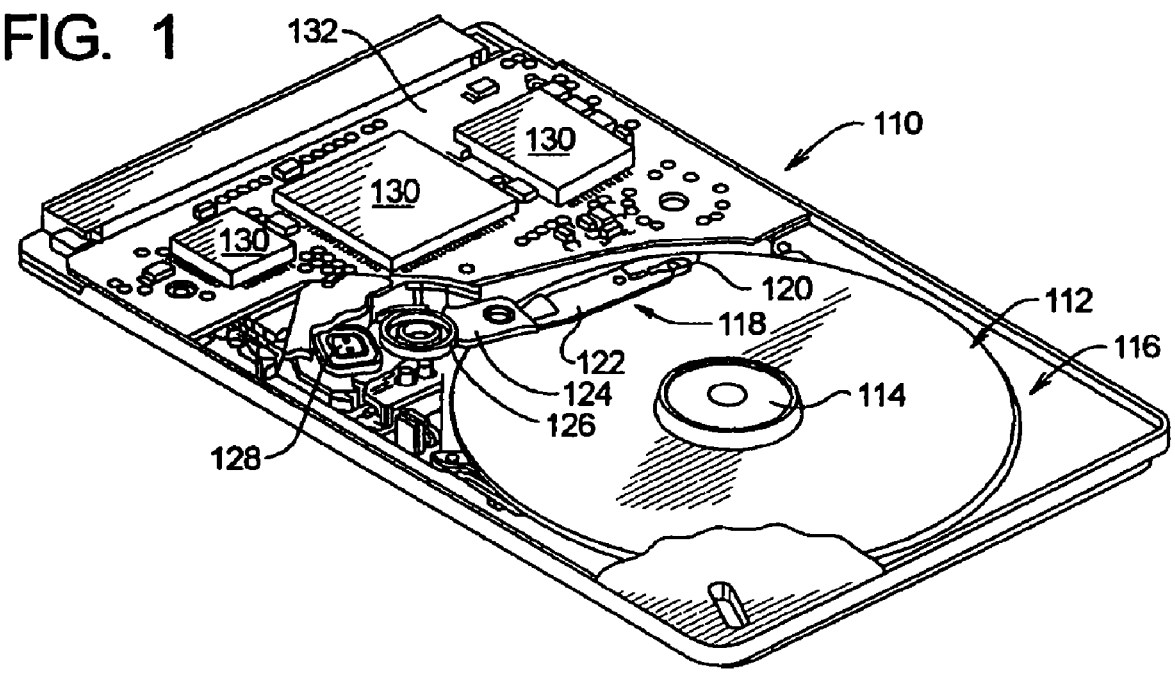
FIG. 1 is a perspective view of a disk drive that can benefit from embodiments of the invention as described herein.

FIG. 1 is a perspective view of a disk drive 110 that can benefit from embodiments of the invention as described herein. For clarity, disk drive 110 is illustrated without a top cover. Disk drive 110 includes a magnetic storage disk 112 that is rotated by a spindle motor 114. Spindle motor 114 is mounted on a base plate 116. An actuator arm assembly 118 is also mounted on base plate 116, and includes an R/W head 120 mounted on a flexure arm 122. Flexure arm 122 is attached to an actuator arm 124 that rotates about a bearing assembly 126. Voice coil motor 128 moves R/W head 120 relative to magnetic storage disk 112, thereby positioning RAN head 120 over the desired concentric data storage track disposed on the surface of magnetic storage disk 112. Spindle motor 114, R/W head 120, and voice coil motor 128 are coupled to electronic circuits 130, which are mounted on a printed circuit board 132. The electronic circuits 130 include a read channel, a microprocessor-based controller, firmware, an analog-to-digital converter (ADC), a digital-to-analog converter (DAC), and random access memory (RAM). For clarity of description, disk drive 110 is illustrated with a single magnetic storage disk 112 and actuator arm assembly 118, however, disk drive 110 may also include multiple disks 112 and multiple actuator arm assemblies 118.

Figure 2:
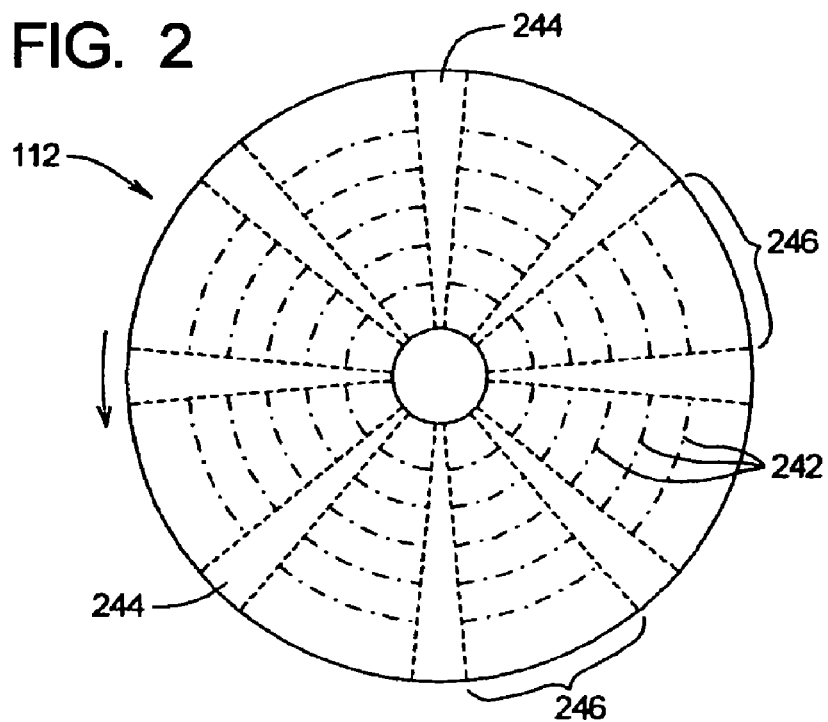
FIG. 2 illustrates a magnetic storage disk.

FIG. 2 illustrates magnetic storage disk 112 with data organized in a typical manner well known in the art. Magnetic storage disk 112 includes concentric data storage tracks 242 for storing data. Each of concentric data storage tracks 242 is schematically illustrated as a centerline, however each of concentric data storage tracks 242 occupies a finite width about a corresponding centerline. Magnetic storage disk 112 includes radially aligned servo spokes 244, also referred to as servo wedges, that cross concentric data storage tracks 242 and store servo information in servo sectors in concentric data storage tracks 242. The servo information is read by R/W head 120 during read and write operations to position the head 120 above a desired track 242, as detailed below. For clarity, a small number of concentric data storage tracks 242 and servo spokes 244 are shown. Typically, the actual number of concentric data storage tracks 242 and servo spokes 244 included on magnetic storage disk 112 is considerably larger.

Disk drive 110 has a servo control system that includes a plant and a servo controller. The plant is defined as the mechanical components of the system and includes disk drive 110, magnetic storage disk 112, spindle motor 114, base plate 116, and actuator arm assembly 118. The moveable element of the plant governed by the servo control system may be variably defined as actuator arm assembly 118, flexure arm 122, and/or R/W head 120. The servo controller is a combination of hardware, including a microprocessor, and firmware, and interfaces with the plant via the DAC and the ADC of disk drive 110. Together, the plant and the servo controller make up a closed-loop servo feedback control system, or "servo loop," for disk drive 110.

In operation, the servo loop for disk drive 110 accurately positions R/W head 120 over a desired concentric data storage track 242 on magnetic storage disk 112 by reading position information with R/W head 120 from servo spokes 244. As is commonly known in the art, a position error signal (PES) is produced by servo bursts located in servo spokes 244 when magnetic storage disk 112 is rotated in proximity to R/W head 120. The PES is used by the servo loop to determine and feed back actual position of R/W head 120, generate an error signal, and then drive the moveable element, i.e., actuator arm assembly 118, flexure arm 122, or R/W head 120, in a direction which reduces the error signal.

The servo loop for disk drive 110 must be stable in closed-loop operation. That is, R/W head 120 must be kept "on track" even though the plant is flexible and subject to external disturbances from noise, resonance, and shock. Because the PES is derived from servo spokes 244, the position of R/W head 120 is only available on a periodic basis at a fixed sampling frequency. Thus, the servo loop can only use periodic position information to compensate for the constant injection of countervailing perturbations of varying amplitude, phase, and frequency—including frequencies beyond the Nyquist frequency of the system.

To overcome the inherent frequency limitations of the servo loop created by a fixed sampling rate for the PES, multirate controllers are commonly used in the art. With a multirate controller, two or more corrections are generated for each position measurement, allowing the controller to compensate for mechanical resonances present in the plant that occur at higher frequencies than the Nyquist frequency. This can be accomplished with the inclusion of a notch filter in the control algorithm that is constructed to notch resonances at the frequencies at which they occur, rather than at their lower alias frequencies found below the Nyquist frequency. However, construction of such a notch filter requires an accurate characterization of the open-loop frequency response of the plant beyond the Nyquist frequency of the PES sampling rate. As described above, such characterization of the open-loop frequency response of the plant is not possible using conventional techniques, since the only available output from the plant is a decimated output produced at a lower sampling rate than the plant input. This decimated output contains alias components that should be understood and quantified in order to obtain a reliable measure of plant frequency response.

Figure 3:
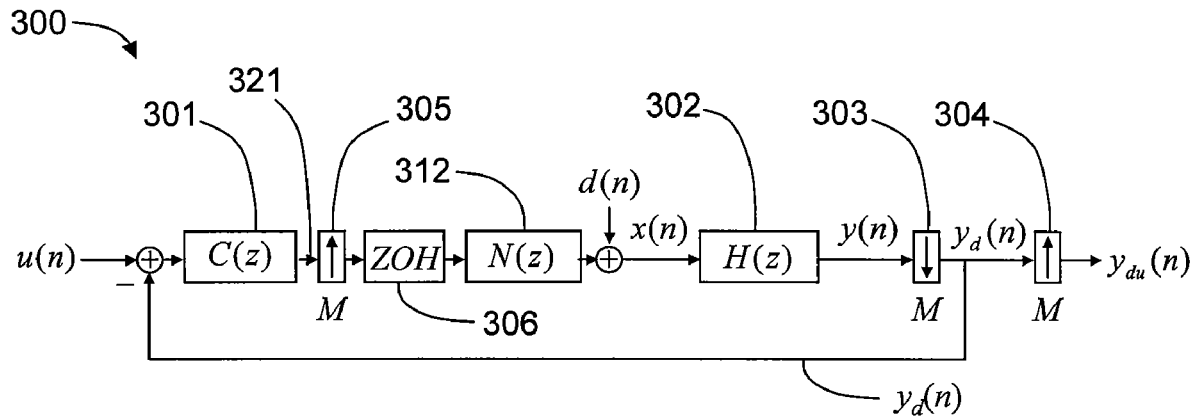
FIG. 3 is a block diagram of a multirate control system that corresponds to the servo loop of the disk drive in FIG. 1.

FIG. 3 is a block diagram of a multirate control system 300 that corresponds to the servo loop of disk drive 110 in FIG. 1. Multirate control system 300 includes a multirate controller 301, a plant 302, a decimator 303 and an upsampler 304, also referred to as an "interpolator." Multirate controller 301 is a discrete time controller, such as a control algorithm residing in the firmware, and is performed by the microprocessor of disk drive 110 and has a transfer function C(z). Multirate controller 301 is an Mx oversampling controller, and generates an input sequence x(n) for plant 302 that contains M correction signals for each PES sample measured, i.e., decimated plant output $y_d(n)$. Plant 302 represents the physical plant of disk drive 110, and has a transfer function H(z), which represents the mechanical response of plant 302 to an input signal. Decimator 303 represents the downsampling of the plant output y(n), where plant output y(n) corresponds to the PES. Downsampling of the PES is inherently necessary in multirate control system 300, since multirate controller 301 produces two or more correction signals for each PES measurement. In effect, decimator 303 "throws out" one or more position samples for each correction signal produced by multirate controller 301, where the "thrown out" position samples represent the position samples that would be measured if there were a one-to-one correspondence between correction signals generated by multirate controller 301 and position measurements produced by R/W head 120. But because R/W head 120 cannot produce an updated PES value when located between servo spokes 244, these fictitious PES measurements are "lost" by decimator 303 and the actual position of R/W head 120 is not measured. For example, if multirate controller 301 is a 3× oversampling controller and produces three correction signals for each position sample, decimator 302 produces an updated position sample, i.e., decimated plant output $y_d(n)$, for every third correction signal input into plant 302, thereby "losing" the position information corresponding the other two correction signals. Upsampler 304 is a mathematical function in the control algorithm that raises the output sample rate to be equal to the input sample rate. No new information regarding plant output is added by upsampler 304; instead, zero values are placed between the stream of samples that make up decimated plant output $y_d(n)$. Multirate controller 300 may also include additional mathematical functions, including an upsampler 305, a zero order holder (ZOH) 311, and a second design component 312, such as a notch filter.

In operation, multirate controller 301 receives an error signal, which is the difference between a reference input u(n) and the decimated plant output $y_d(n)$, and produces a correction signal 321. Correction signal 321 may be processed by upsampler 305, zero order holder 311, and second design component 312, if present. According to embodiments of the invention, a disturbance d(n) is introduced into correction signal 321 to produce input sequence x(n), which is then input into plant 302 as shown. Transfer function H(z) of plant 302 then produces plant output sequence y(n), which is down-sampled by decimator 303, thereby producing decimated plant output $y_d(n)$. Decimated plant output $y_d(n)$ is then fed back for comparison to reference input u(n), and is also upsampled by upsampler 304 to the same sample rate as the input sample rate, thereby producing decimated-upsampled plant output $y_{du}(n)$.

In order to fully describe certain aspects of the invention, the following mathematical definitions are provided with respect to elements of multirate control system 300, where multirate controller 301 is an Mx oversampling controller:

Given a sequence x(n), let $x_d(n)$ be the decimated sequence produced by keeping only every M-th sample of x(n). Therefore, $$x_d(n) = x(Mn) \quad (1)$$

If the frequency spectrum of x(n) is $X(e^{jw})$, then the frequency spectrum $X_d(e^{jw})$ is $$X_d(e^{jw}) = \sum_{i=0}^{M-1} X(e^{-\frac{j(w-2\pi i)}{M}}) \quad (2)$$

Decimating the original sequence by an integral rate M corrupts the original frequency spectrum with M−1 alias components. These alias components are artifacts of the sampling of sequence x(n).

Letting $x_u(n)$ be the upsampled sequence produced by inserting M−1 zeros between each element of sequence x(n):

$$x_u(n) = \begin{cases} x(k) & n = Mk, k \in Z \\ 0 & \text{otherwise} \end{cases} \quad (3)$$

The frequency spectrum $X_u(e^{jw})$ of upsampled sequence $x_u(n)$ is:

$$X_u(e^{jw}) = X(e^{jwM}) \quad (4)$$

Finally, let $x_{du}(n)$ be the sequence produced by inserting M−1 zeros between each element of $x_d(n)$, i.e., the decimated-upsampled sequence.

$$x_{du}(n) = \begin{cases} x(k) & n = Mk, k \in Z \\ 0 & \text{otherwise} \end{cases} \quad (5)$$

The frequency spectrum $X_{du}(e^{jw})$ of the decimated-upsampled sequence $x_{du}(n)$ is:

$$X_{du}(e^{jw}) = X_d(e^{jwM}) = \sum_{i=0}^{M-1} X(e^{j(w-\frac{2\pi i}{M})}) \quad (6)$$

It is noted that upsampling the decimated sequence to produce the sequence $x_{du}(n)$ and its associated frequency spectrum $X_{du}(e^{jw})$ restores the original sample rate, but does not remove the alias components.

Figure 4:
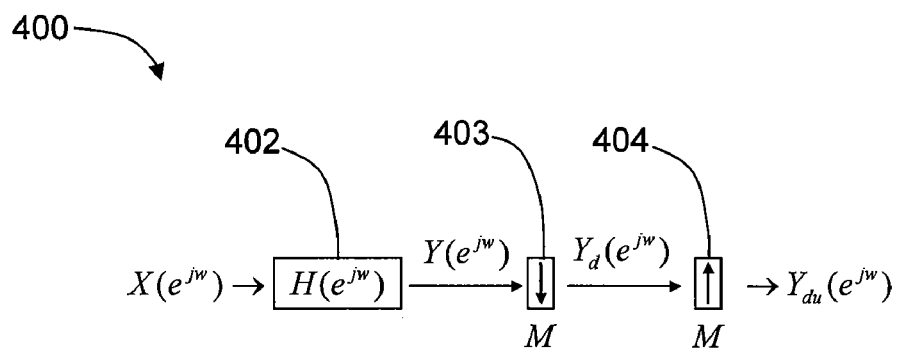
FIG. 4 is a block diagram illustrating the decimation and upsampling of plant output in an open loop environment.

To better describe an embodiment of the invention, in which the frequency response of a plant is measured in a closed-loop environment, an open loop scenario is first considered. FIG. 4 is a block diagram illustrating the decimation and upsampling of plant output in an open loop environment. Input sequence x(n) is passed through a linear time invariant system 400, which includes plant 402, decimator 403, and upsampler 404. Sequence y(n) is the output sequence and $Y(e^{jw})$ is the frequency spectrum thereof. In this system, the true output sequence is unavailable because the sampling rate is a factor of M lower than the output rate. Instead, the decimated output $y_d(n)$ is accessible, from which the decimated-upsampled sequence $y_{du}(n)$ is easily constructed. The frequency spectrum $Y_{du}(e^{jw})$ of the sequence $y_{du}(n)$ is computed by applying Equation (6):

$$Y_{du}(e^{jw}) = \sum_{i=0}^{M-1} Y(e^{j(w-\frac{2\pi i}{M})}) = \sum_{i=0}^{M-1} H(e^{j(w-\frac{2\pi i}{M})})X(e^{j(w-\frac{2\pi i}{M})}) \quad (7)$$

Measuring the frequency response $H(e^{jw})$ of plant 402 using only the available outputs is now described. Because linear time invariant system 400 is an open-loop system, the input sequence $x(n)$ can be chosen, and the alias components are not an issue, as illustrated by Equations 8, 9, and 10. To measure the frequency response $H(e^{jw})$ at a frequency $w=\Omega$, a sequence could be injected, for example, at a frequency $\Omega$, so that:

$$X(e^{jw}) = \begin{cases} 1 & w = \Omega \\ 0 & \text{otherwise} \end{cases} \quad (8)$$

Then the frequency spectrum of the decimated-upsampled sequence would be:

$$Y_{du}(e^{jw}) = \begin{cases} H(e^{j\Omega}) & w = \Omega + \frac{2\pi i}{M}, i = 0, \ldots, M-1 \\ 0 & \text{otherwise} \end{cases} \quad (9)$$

The desired frequency response measurement is simply $Y_{du}(e^{j\Omega})$. In practice, the input sequence might have an arbitrary amplitude and phase, so the desired frequency response is:

$$H(e^{j\Omega}) = \frac{Y_{du}(e^{j\Omega})}{X(e^{j\Omega})}. \quad (10)$$

The response at frequencies other than $\Omega$ can be computed following the same procedure. Aliasing in this case is not a concern, even at frequencies beyond the Nyquist frequency of the sampling rate.

When measuring the frequency response of a system in a closed-loop environment, however, the input sequence $x(n)$ cannot be arbitrarily chosen. This is the case when measuring the frequency response $H(e^{jw})$ of plant 302 of multirate control system 300, illustrated in FIG. 3. Because the servo loop of multirate control system 300 must operate in order to measure the frequency response of plant 302, an open loop measurement of the frequency response cannot be performed.

A disturbance $d(n)$ can be added to the system, but this disturbance is filtered by the loop, and in the case of multirate systems, the inherent decimation of such systems produces alias components of the disturbance that also propagate around the loop.

Figure 5:
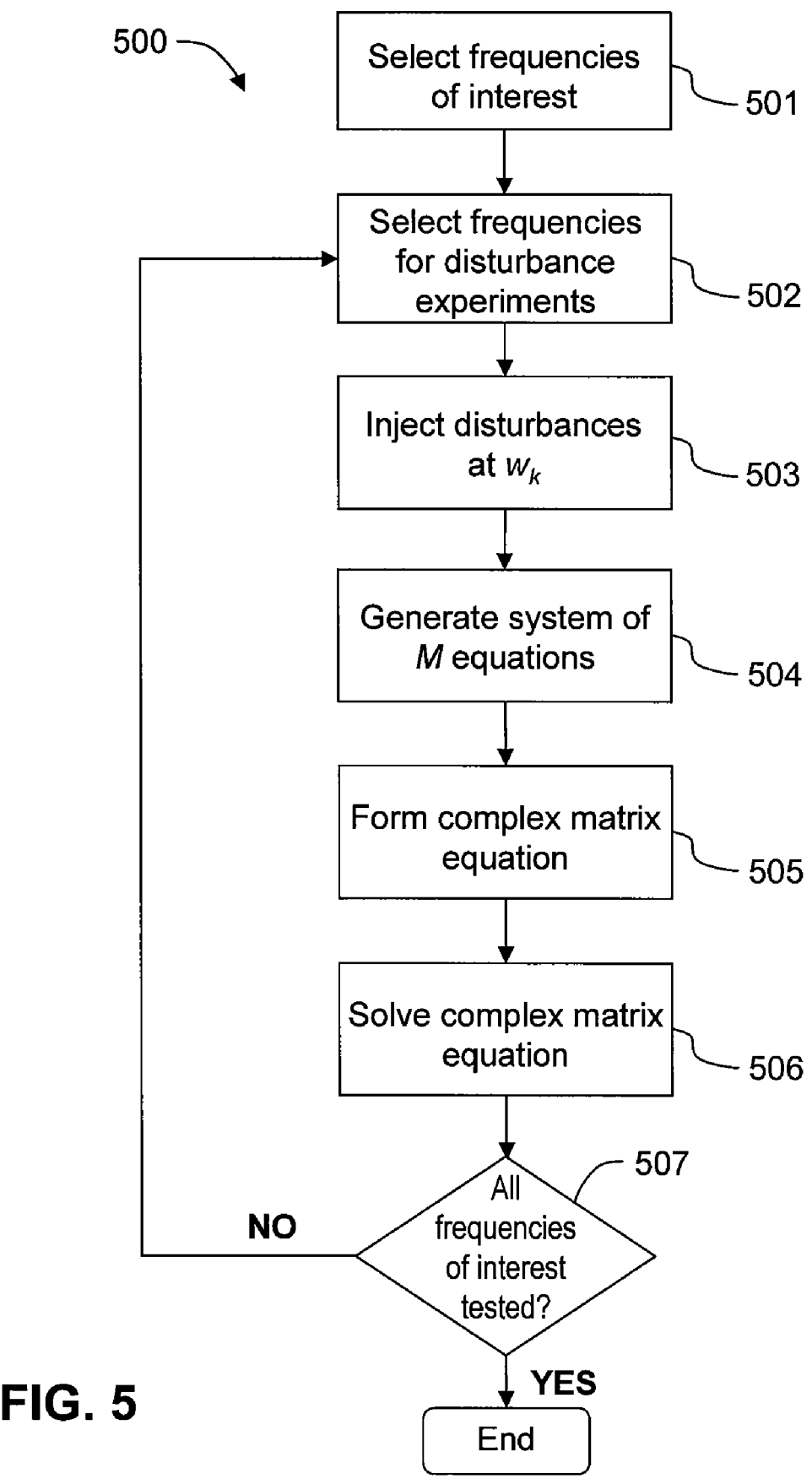
FIG. 5 is a flow diagram summarizing a method for determining the frequency response of a multirate system in a closed-loop environment, according to an embodiment of the invention.

FIG. 5 is a flow diagram summarizing a method 500 for determining the frequency response $H(e^{jw})$ of an Mx multirate system in a closed-loop environment, according to an embodiment of the invention. No special measurements or additional information is required regarding the behavior of the system to perform this method. It is only necessary to measure input sequence $x(n)$ and the decimated and decimated-upsampled output sequences.

In step 501, the frequencies of interest are selected that will ultimately be used to determine the frequency response of the system. In order to approximate the actual frequency response of a system, the number of frequencies is a relatively large number, e.g., 600-800. These frequencies may range from just above 0 Hz to the Nyquist frequency. In one embodiment, the frequencies of interest are evenly spaced between 0 Hz and the highest frequency of interest, for example: 10 Hz, 20 Hz, 30 Hz . . . . In another embodiment, the frequencies of interest may be unevenly spaced to allow greater resolution in selected frequency bands.

In step 502, frequencies are selected for the battery of experiments performed in step 503. One frequency selected is one of the frequencies of interest defined in step 501, and the remaining frequencies are the alias frequencies of the selected frequency of interest. A total of M frequencies is selected, where M is the level of oversampling of the multirate system. The first frequency $\Omega$ is the frequency of interest defined in step 501, and the additional frequencies are the alias frequencies of $\Omega$. Thus, for a 2× multirate system, M=2, and 2 frequencies are selected, one of which is an alias frequency. For a 3× multirate system, M=3, and 3 frequencies are selected, two of which are alias frequencies. The frequencies selected in step 502 are defined as:

$$w_k = \Omega - \frac{2\pi k}{M}, k = 0, \ldots, M-1 \quad (11)$$

In step 503, for each $W_k$, an individual experiment is performed, i.e., a disturbance, such as disturbance $d(n)$ in FIG. 3, to the system is injected into the input, such as disturbance $x(n)$ in FIG. 3, at the frequency $w_k$. For each disturbance experiment, the frequency response of the decimated-upsampled output $Y_{du}(e^{\hat{}}jw_k)$ and the frequency response of the input at each of the M frequencies is measured, thereby providing: $X_k(e^{\hat{}}jw_0), \ldots, X_k(e^{\hat{}}jw_{M-1})$.

In step 504, the frequency spectra generated in step 503 are substituted into Equation 7, which yields a system of M equations:

$$Y_{du}(e^{jw_0}) = H(e^{jw_0})X_0(e^{jw_0}) + H(e^{jw_1})X_0(e^{jw_1}) + \ldots + H(e^{j2w_{M-1}})X_0(e^{jw_{M-1}}) \quad (12)$$

$$Y_{du}(e^{jw_1}) = H(e^{jw_0})X_1(e^{jw_0}) + H(e^{jw_1})X_1(e^{jw_1}) + \ldots + H(e^{jw_{M-1}})X_1(e^{jw_{M-1}})$$

$$\vdots \qquad \vdots \qquad \vdots \qquad \vdots$$

$$Y_{du}(e^{jw_{M-1}}) = H(e^{jw_0})X_{M-1}(e^{jw_0}) + H(e^{jw_1})X_{M-1}(e^{jw_1}) + \ldots + H(e^{jw_{M-1}})X_{M-1}(e^{jw_{M-1}})$$

In step 505, an M×M complex matrix equation is formed from the system of M equations 12:

$$\begin{bmatrix} X_0(e^{jw_0}) & \cdots & X_0(e^{jw_{M-1}}) \\ \vdots & \ddots & \vdots \\ X_{M-1}(e^{jw_0}) & \cdots & X_{M-1}(e^{jw_{M-1}}) \end{bmatrix} \begin{bmatrix} H(e^{jw_0}) \\ \vdots \\ H(e^{jw_{M-1}}) \end{bmatrix} = \begin{bmatrix} Y_{du}(e^{jw_0}) \\ \vdots \\ Y_{du}(e^{jw_{M-1}}) \end{bmatrix} \quad (13)$$

In step 506, complex matrix equation 14 is solved for the M complex unknowns $H(e\hat{j}w_0), \ldots, H(e\hat{j}w_{M-1})$. First, all rows of the matrix are normalized by dividing row k by $X_k(e\hat{j}w_k)$, letting $D(e\hat{j}w_k) = Y_{du}(e\hat{j}w_k)/X_k(e\hat{j}w_k)$ be the k-th direct output transfer function and letting $C_k(e\hat{j}w_1) = X_k(e\hat{j}w_1)/X_k(e\hat{j}w_k)$ be the k-th cross input transfer function for frequency $w_1$. After normalization, the matrix becomes:

$$\begin{bmatrix} 1 & \cdots & C_0(e^{jw_{M-1}}) \\ \vdots & \ddots & \vdots \\ C_{M-1}(e^{jw_0}) & \cdots & 1 \end{bmatrix} \begin{bmatrix} H(e^{jw_0}) \\ \vdots \\ H(e^{jw_{M-1}}) \end{bmatrix} = \begin{bmatrix} D(e^{jw_0}) \\ \vdots \\ D(e^{jw_{M-1}}) \end{bmatrix} \quad (14)$$

The solution provides the frequency response of the system at the frequency of interest and at each alias of the frequency of interest, i.e., $H(e\hat{j}w_0), \ldots, H(e\hat{j}w_{M-1})$.

In step 507, confirmation is made whether all of the frequencies of interest defined in step 501 have been tested for frequency response. If no, the procedure returns to step 502. If yes, method 500 is complete.

In sum, method 500 allows the accurate characterization of the open-loop frequency response of a multirate system, even while the system is operating in a closed-loop environment. No additional information or specialized measurements are required than are commonly used in the art for frequency response measurements. As one of skill in the art will appreciate, accurate understanding of the open-loop frequency response of a system enables the construction of robust notch filters that enhance the accuracy and stability of a control system.

Mechanical sensitivity and tight mechanical tolerances are associated with the components making up the plant of a typical disk drive. Consequently, external factors such as temperature and radial head position can significantly influence the frequency response of a disk drive plant. In light of this, it is contemplated that method 500 and/or embodiments thereof may be used to characterize the frequency response of a given plant over a range of temperatures and/or operating conditions. For example, the frequency response of a disk drive may be characterized according to methods disclosed herein while the R/W head is positioned at different locations relative to the magnetic disk, such as over the inner diameter, the outer diameter, and/or a central track of the magnetic disk. It is also contemplated that the frequency response of a disk drive may be characterized at different values of other operating conditions as well, such as barometric pressure and temperature. In one embodiment, each of the multiple heads contained in a disk drive may be defined as a different plant that undergoes method 500 to determine the unique frequency response of each head.

Procedures for characterizing frequency response, both those known in the art and method 500 described above, can be time-consuming and labor-intensive. This is because specialized test equipment is required and each test typically involves several hundred data points, i.e., frequencies of interest. In addition, a large battery of tests may be performed on a given drive under a variety of operating conditions, as described above. Thus, the process of designing a candidate controller, measuring the frequency response of a system using the candidate controller, and quantifying the performance of the candidate controller can be a lengthy and expensive process. In one embodiment of the invention, the performance of candidate controllers for a given physical plant is tested and quantified "off-line," that is, without re-measuring the system performance while controlled by each candidate controller.

It is known that given a system with an accurately characterized open-loop frequency response, it is possible to compute numerous performance metrics, including gain margin, phase margin, stability margin, vector margin, and error rejection. With these metrics, the performance of the system, and particularly the controller, can be easily quantified and compared to other controllers. For the closed loop control system 600 in FIG. 6, the open loop response is $G(e^{jw}) = C(e^{jw})P(e^{jw})$. If the plant $P(e^{jw})$ is measured or known and the controller $C(e^{jw})$ is modeled, then the controller can be designed offline. In this way, it is possible to synthesize, i.e., model, the open loop response for a number of different candidate controller designs, and, hence, to predict the system performance without re-measuring the frequency response for each controller design.

In multirate control system 300 illustrated in FIG. 3, the components in the loop not part of the controller 301 consist of upsampler 305, ZOH 311, second design component 312, which may represent a notch filter or a set of notch filters $N(e^{jw})$, the actual physical plant $H(e^{jw})$, and a decimator. The open loop response now must include the effects of aliasing.

$$G(e^{jw}) = \sum_{i=0}^{M-1} C(e^{j(w - \frac{2\pi i}{M})}) ZOH(e^{j(\frac{w - 2\pi i}{M})}) N(e^{j(\frac{w - 2\pi i}{M})}) H(e^{j(\frac{w - 2\pi i}{M})}) \quad (15)$$

Figure 6:
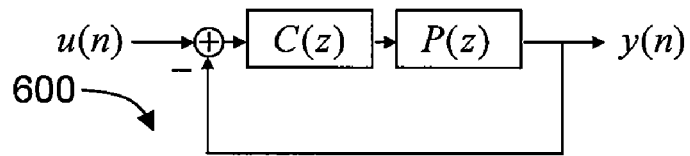
FIG. 6 is a block diagram of a closed loop control system.

If $H(e^{jw})$ is measured, for example, by using the embodiments of the invention described above, and if controller 301, ZOH 311, and the notch frequency responses of second design component 312 are all modeled, then the controller and notch can be designed offline using open loop synthesis described for closed loop control system 600 in FIG. 6.

Figure 7A:
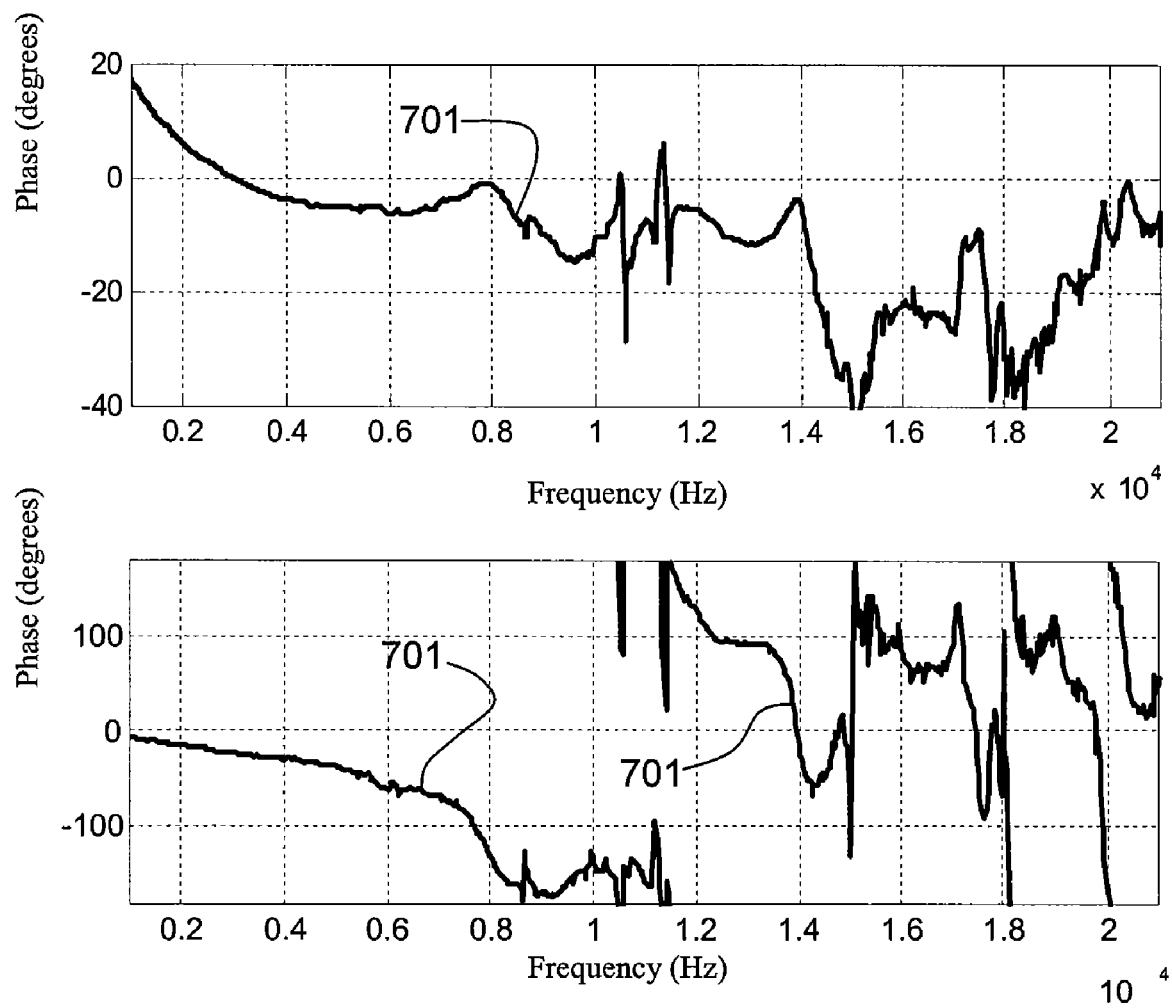
FIGS. 7A-B illustrate the measured open loop response, the synthesized open loop response, and the two complex components of the open loop response of a closed loop multirate system employing 2× oversampling.
Figure 7B:
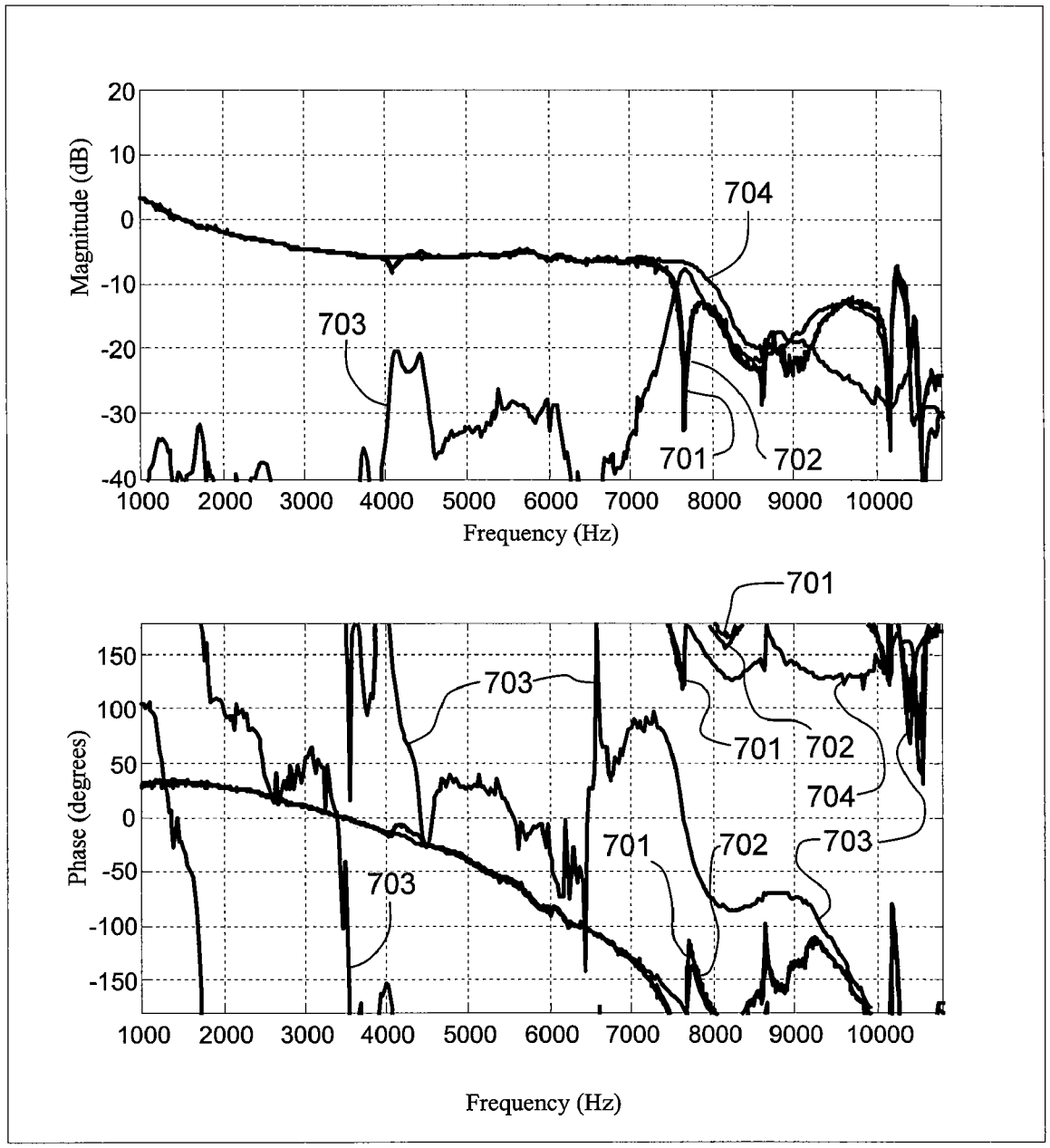

The offline design method is effective only if the synthesized open loop correctly predicts the actual measured open loop. By way of demonstration, in one example, the synthesized open loop of a closed loop multirate system is shown to correctly predict the actual measured open loop of the system. The plant measured is the actuator of a 2.5" laptop disk drive and its associated drive electronics. The plant includes the transport delay inherent in the digital control method that the drive uses. In this example, the sample rate is 21,600 Hz and M=2. The Nyquist frequency is 10,800 Hz but, as shown in FIG. 7A, the illustrates the measured open loop response 701 shows resonant features well beyond the Nyquist frequency. FIG. 7B illustrates the measured open loop response 701, the synthesized open loop response 702, and the two complex components 703, 704 of the open loop response of a closed loop multirate system. Together, the two complex components 703, 704 of the open loop response make up synthesized open loop response 702. As shown, synthesized open loop response 702 is nearly indistinguishable from measured open loop response 701, and correctly predicts the deviations in the 4000 Hz-4500 Hz region resulting from the alias of plant resonances at 17100 Hz-17600 Hz. The synthesized open loop response 702 also correctly predicts the existence, if not the precise placement or extent of, the near cancellation, which occurs near 7700 Hz.

Figure 8:
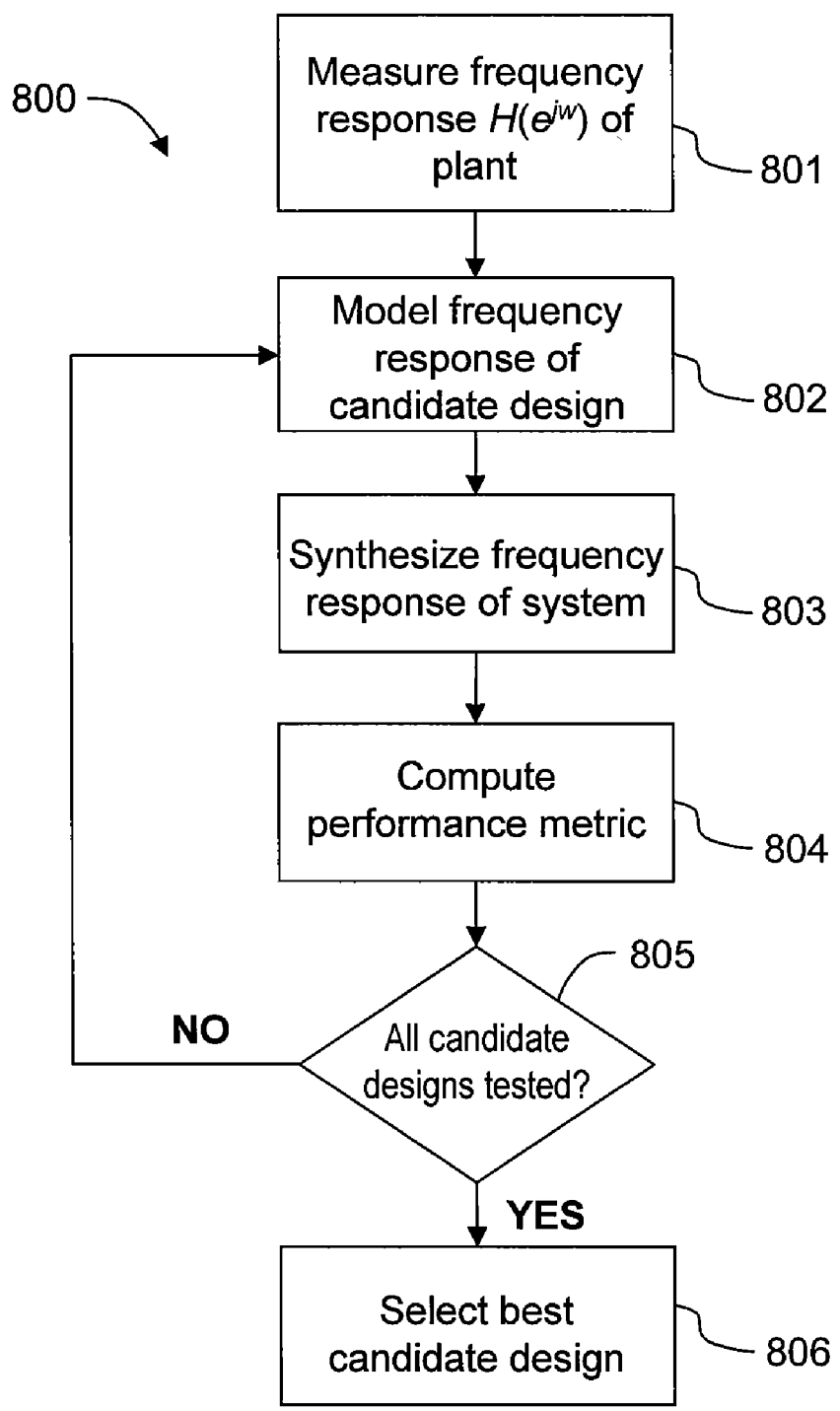
FIG. 8 is a flow diagram summarizing a method for automated filter and/or controller selection, according to an embodiment of the invention.

To further expedite the process of implementing optimal controllers and/or filters for a particular system, the offline design method described above in conjunction with FIGS. 6 and 7 may be extended to automate controller or notch filter selection in the manufacturing process. FIG. 8 is a flow diagram summarizing a method 800 for automated filter and/or controller selection, according to an embodiment of the invention. In method 800, the performance of k candidate controllers and/or notch filters is quantified and compared against each of the other candidates.

In step 801, the frequency response $H(e^{jw})$ of a system plant is measured using method 500, and k is set=1. In step 802, the k-th controller or notch filter is selected and the frequency response $C_k(e^{jw})$ or $N_k(e^{jw})$ of the selected candidate controller or notch filter is modeled. In step 803, the open loop frequency response of the system $H(e^{jw})$ is synthesized. This synthesis uses the measured plant, as characterized in step 801, models of the k-th candidate controller or candidate notch filter, and models of the other loop components (ZOH, for example). In step 804, a performance metric is computed for the k-th candidate controller or candidate notch filter. The performance metric may include factors such as gain margin, phase margin, vector margin, and error rejection, among others. In this way, the performance of the candidate controller or notch filter is quantified. In step 805, confirmation is made whether the current candidate is the last candidate controller or notch filter to be tested. If yes, the procedure continues to step 806. If not, k is set equal to k+1 and the procedure returns to step 802. In step 806, the candidate design with the best performance metric is selected for use with the system.

As with method 500 described above, it is contemplated that method 800 and/or embodiments thereof may be performed for a variety of operating conditions to more rigorously characterize the performance of each candidate design. In this embodiment, in may be necessary to perform step 801 for each change or combination of changes in operating conditions, including temperature, barometric pressure, fly-height, radial location, etc. In one embodiment, the results produced by method 800, i.e., the performance metrics for each candidate design, are retained for use in a factory setting. In this embodiment, a different controller or notch filter candidate may be provided to a drive based on physical characteristics of the drive. For example, a suite of candidate controllers may be available during the manufacture of disk drives, and disk drives determined to have a general category of behavior, such as a particular frequency response, may be provided with a controller or notch filter that has been optimized for that category of behavior. Alternatively, a suite of controllers and/or notch filters may be saved in the non-volatile memory of a disk drive. In this way, the optimal controller and/or notch filter for a given set of operating conditions is available for use throughout the life of the drive. For example, one candidate controller may be used by the drive under certain operating conditions, e.g., high temperature, and another candidate controller may be used by the drive under other operating conditions.

While the foregoing is directed to embodiments of the present invention, other and further embodiments of the invention may be devised without departing from the basic scope thereof, and the scope thereof is determined by the claims that follow.

What is claimed is:

1. A method for evaluating performance of a multirate system controller, comprising the steps of:
    (a) selecting a frequency of interest;
    (b) injecting a first disturbance at the frequency of interest as an input into a multirate system;
    (c) measuring a response of the multirate system after the step (b) of injecting;
    (d) injecting a second disturbance at an alias frequency of the frequency of interest as an input into a multirate system;
    (e) measuring a response of the multirate system after the step (d) of injecting;
    (f) repeating steps (a) through (e) for different frequencies of interest; and
    (g) determining effectiveness of the multirate system controller using the measured responses.

2. The method according to claim 1, wherein steps (a) through (e) are repeated for hundreds of different frequencies of interest.

3. The method according to claim 2, wherein the different frequencies of interest range from about 0 Hz to about the Nyquist frequency.

4. The method according to claim 1, wherein the frequency of interest has more than one alias frequency and steps (d) and (e) are carried out separately for each of the alias frequencies.

5. The method according to claim 1, wherein the step of determining includes:
    determining a frequency response of the multirate system using the measured responses; and
    modeling a frequency response of the controller.

6. The method according to claim 5, wherein the effectiveness is determined based on factors including gain margin, phase margin, and vector margin.

7. The method according to claim 6, wherein the effectiveness is determined at different operating conditions.

* * * * *